United States Patent
Leimbach et al.

[11] Patent Number: 6,144,928
[45] Date of Patent: Nov. 7, 2000

[54] METHOD AND DEVICE FOR DETERMINING VEHICULAR MASS

[75] Inventors: Klaus-Dieter Leimbach, Moeglingen; Hans Veil, Eberdingen, both of Germany

[73] Assignee: Robert Bosch GmbH, Stuttgart, Germany

[21] Appl. No.: 09/093,524

[22] Filed: Jun. 8, 1998

[30] Foreign Application Priority Data

Jun. 7, 1997 [DE] Germany ................... 197 24 092

[51] Int. Cl.[7] ................................. G01G 19/00
[52] U.S. Cl. .................. 702/173; 702/142; 73/865; 73/862.192
[58] Field of Search ............... 702/173, 175, 702/142, 141; 73/865, 862.192, 862.31; 177/136, 141

[56] References Cited

U.S. PATENT DOCUMENTS

| | | | |
|---|---|---|---|
| 4,548,079 | 10/1985 | Klatt | 702/175 |
| 4,656,876 | 4/1987 | Fremd | 702/175 |
| 4,941,365 | 7/1990 | Reiner et al. | 702/173 |
| 5,002,343 | 3/1991 | Brearley et al. | |
| 5,460,434 | 10/1995 | Micke et al. | |
| 5,482,359 | 1/1996 | Breen | 303/9.69 |
| 5,500,798 | 3/1996 | Inagaki | |
| 5,610,372 | 3/1997 | Phillips et al. | 702/173 |
| 5,726,886 | 3/1998 | Yamakado et al. | 701/93 |

FOREIGN PATENT DOCUMENTS

| | | |
|---|---|---|
| 2 280 069 | 2/1976 | France . |
| 24 49 765 | 5/1976 | Germany . |
| 42 28 413 | 3/1994 | Germany . |
| 44 42 487 | 3/1996 | Germany . |
| 93 18385 | 9/1993 | WIPO . |

*Primary Examiner*—Marc S. Hoff
*Assistant Examiner*—Bryan Bui
*Attorney, Agent, or Firm*—Kenyon & Kenyon

[57] ABSTRACT

A vehicular mass is determined, or a signal indicative thereof is generated, in particular for a commercial vehicle having a towing vehicle and a trailer/semitrailer. The vehicle has actuatable braking devices, which act, in particular, on the wheels of the towing vehicle and/or on the wheels of the trailer/semitrailer. At least one first acceleration value representing the vehicle's acceleration before the braking device is actuated, and at least one second acceleration value representing the vehicle's acceleration after the braking device is actuated, are measured. The vehicular mass or the signal indicative of the vehicular mass are determined and produced, respectively, as a function of the first and second measured acceleration values.

16 Claims, 5 Drawing Sheets

METHOD AND DEVICE FOR DETERMINING VEHICULAR MASS

FIELD OF THE INVENTION

The present invention relates to a method and a device for determining vehicular mass.

BACKGROUND INFORMATION

A variety of systems for controlling the driving dynamics of motor vehicles in open and closed loop is known. For the most part, these relate to driving the braking systems. In such systems, it is important to have the most precise knowledge possible of the vehicular mass.

If the motor vehicle is a commercial vehicle having a towing vehicle and a trailer/semitrailer, then it is possible for the braking forces to be optimally adjusted in terms of economic efficiency, safety, and ride comfort, when the masses of the towing vehicle and of the trailer/semitrailer are known as precisely as possible. If the mass of the entire trailer train and the mass of the towing vehicle are known, then the mass of the trailer/semitrailer can be determined. Since, however, during normal operation of commercial vehicles, substantial differences in the load arise and, thus, in the total mass of the vehicle, it is necessary to continually redefine the total mass and the mass distribution between the towing vehicle and the trailer/semitrailer. Thus, the driving stability can be enhanced by properly distributing the braking torques among the individual wheel brakes.

German Patent Application No. 42 28 413 describes how to determine the total mass of a vehicle by measuring the vehicle's longitudinal acceleration and corresponding tractive or motive forces at two different instants in brief succession during one acceleration operation of the vehicle. The vehicular mass can then be determined as a function of these measured quantities.

One of the objects of the present invention is to provide a most precise and simple possible way to determine mass during other operating states of the vehicle.

SUMMARY OF THE INVENTION

The present invention enables a determination of vehicular mass or produces a signal indicative thereof, in particular, for a commercial vehicle having a towing vehicle and a trailer/semi-trailer. In this context, the vehicle has actuatable braking devices, which act, in particular, on the wheels of the towing vehicle and/or on the wheels of the trailer/semitrailer. According to the present invention, at least one first acceleration value representing the vehicle's acceleration before the braking device is actuated, and at least one second acceleration value representing the vehicle's acceleration after the braking device is actuated, are measured. The vehicular mass or the signal indicative of the vehicular mass is then determined or produced as a function of the first and second measured acceleration values. In this connection, what is meant by actuation of the braking devices is that the braking devices are operated along the lines of a braking or deceleration action.

Therefore, mass can be determined on the basis of a braking operation. In this context., according to the present invention, the acceleration or deceleration values of the vehicle are considered immediately before and immediately after the actual braking operation is introduced. From the acceleration or deceleration values of the vehicle sensed at these instants, the vehicular mass can be determined in a relatively simple manner using available sensory mechanisms.

Provision is made, in particular, according to the present invention for a braking value to be measured, which represents the braking action resulting from actuation of the braking device, in particular during the time that the second acceleration value is measured. The vehicular mass is also determined at that time as a function of the measured braking value.

Generally, commercial vehicles are equipped with pneumatic or hydraulic-pneumatic braking devices, which enable the individual wheels of the towing vehicle and of the trailer/semitrailer to be braked, usually using friction pads (e.g., brake linings). Besides these wheel-braking devices, which are generally not designed for continuous operation, provision is made for supplementary retarding braking devices, such as an engine braking system and/or a retarder. These supplementary retarding braking devices generally act via the drive train on the driven wheels of the towing vehicle.

Provision is made in an embodiment of the present invention for the second acceleration value to be measured when the braking devices are not yet acting upon the wheels of the trailer/semitrailer. This is associated with the following advantage:

During normal operation, the towing vehicle is often operated with changing (i.e., different) trailers/semitrailers. These trailers/semitrailers often have very different wheel-braking devices, which is why it is difficult, without make costly adjustments to each trailer/semitrailer, to obtain the exact braking values for the trailer/semitrailer, for example from the braking pressure. If one measures the second acceleration value when the braking devices are not yet acting upon the wheels of the trailer/semitrailer, then the braking value of the trailer/semitrailer at this instant is zero.

As indicated above, as an actuatable braking device, at least one wheel-braking device on the towing vehicle and/or for a supplementary retarding braking system is provided (such as a retarder and/or an engine braking system).

To determine the instant described above when the braking devices are not yet acting upon the wheels of the trailer/semitrailer, one can utilize, on one hand, the delay between the time the braking pressure which is fed into the wheels of the towing vehicle and the time the braking pressure which is fed into the wheels of the trailer/semitrailer. On the other hand, it is also possible to use only those braking phases for determining mass which act only upon the wheels of the towing vehicle using the mentioned supplementary retarding braking device. It is advantageous in this case that neither knowledge of the wheel brakes of the towing vehicle nor of the trailer/semitrailer is needed.

In the case of wheel brakes actuated by pressurized media (i.e., hydraulic brakes), the braking value can be determined as a function of the wheel brake pressures. In the case of wheel brakes actuated electromotively, the braking value can be determined as a function of a variable representing the actuation, while in the case of a retarder and/or of an engine braking system, the braking value can be determined as a function of the retarder and/or of the engine braking torque.

Provision can be made, in particular, in the latter case, when working with a hydrodynamic retarder, for the braking value to be determined as a function of a variable representing the hydraulic pressure or, in the case of an engine braking system, for the braking value to be determined as a function of the position of a switch that activates the engine braking system.

A propulsion (tractive) value representing the drive or propulsion (e.g., a propelling power) of the vehicle can be measured and the first acceleration value can then be measured when the measured propulsion value exhibits or falls below a predefinable value, in particular the value zero. In this manner, a way to determine the force ratios can be simplified when the first acceleration value is measured.

The first acceleration value can be determined by detecting a deceleration value representing the driver's input command for decelerating the vehicle, for example the position of the gas and/or brake pedal. The first acceleration value is determined when the measured deceleration value is of a predefinable value, in particular the value zero.

It is also advantageous for the first and/or the second acceleration value to be low-pass filtered.

If the properties of the wheel-brake devices of the trailer/semitrailer are sufficiently known, then a third acceleration value can be determined when the braking devices act upon the wheels of the trailer/semitrailer. The vehicular mass can also be determined then as a function of the third measured acceleration value.

DETAILED DESCRIPTION

Figure 1:
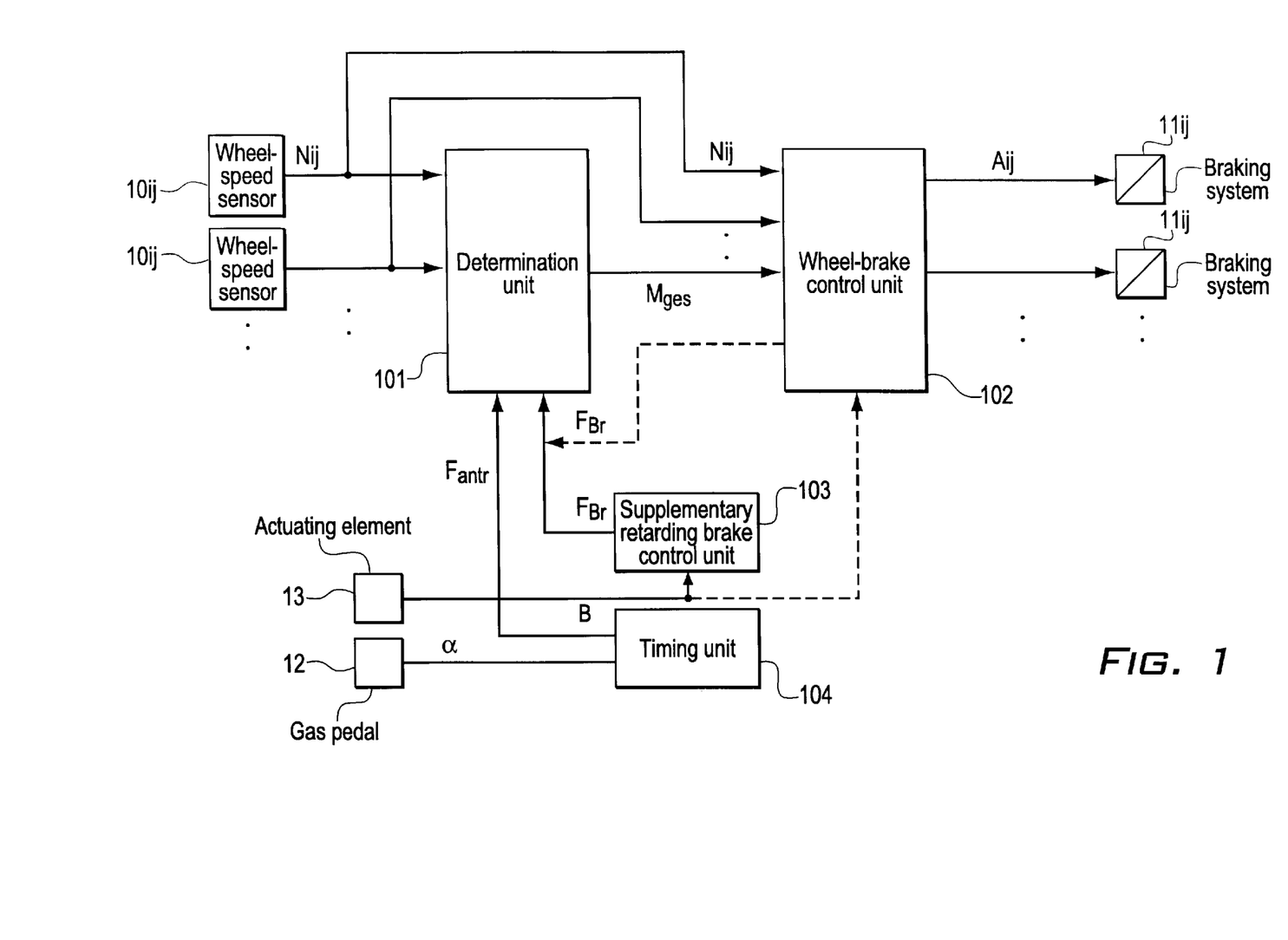
FIG. 1 shows a general block diagram of the method and device according to the present invention.

FIG. 1 shows wheel-speed sensors $10ij$, which sense the rotational speeds of the vehicle wheels. The signals are fed to block 101, which determines total vehicle mass $M_{ges}$ and feeds this to block 102. As a function of total mass $M_{ges}$ and wheel speeds Nij, braking systems $11ij$, in particular the individual wheel braking systems are driven in block 102 when the driver signals a braking or deceleration command via actuating element 13 (brake pedal and/or supplementary retarding-braking actuating element, signal B).

In addition, to determine mass, block 101 is fed with a tractive (e.g., motive) force $F_{antr}$ or the drive torque from valve the timing unit 104. Moreover, block 101 is fed braking force $F_{Br}$ from wheel-brake control unit 102 and/or from supplementary retarding braking control unit 103. Block 101 defines a drive (e.g., propelling power) command via position α of gas pedal 12.

General Consideration of a Braking Operation

The basis of the present invention is a one-dimensional balance of momentum of the moving trailer train produced at different points in time. Thus, a braking operation shall be described on the basis of FIG. 2.

Figure 2:
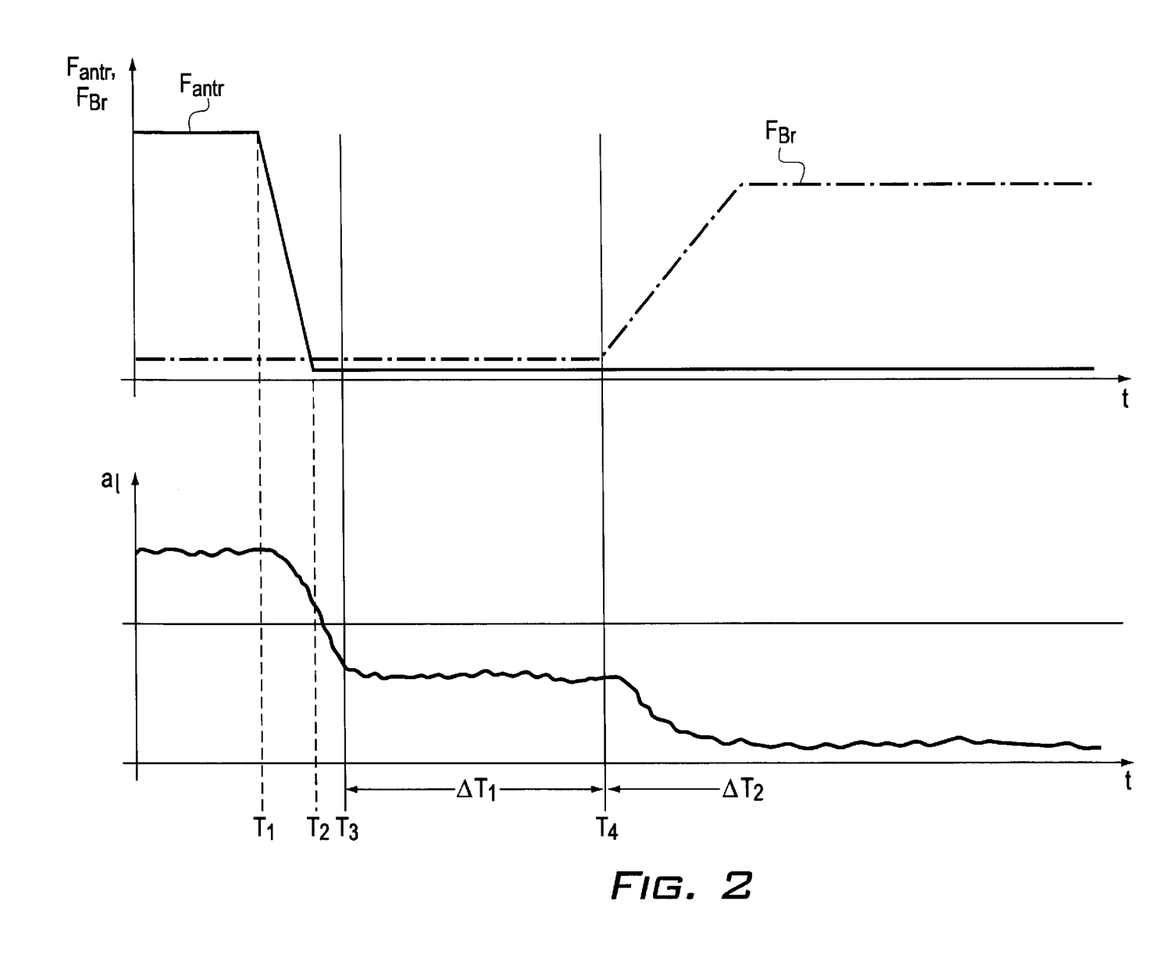
FIG. 2 shows a first variation in a braking operation over time.

At instant $t_1$, which is before instant $T_4$, when the vehicle is not braked, it applies that:

$$M_{ges}*a_1 = F_{antr1} + F_{Reib1} + F_{L1} + F_{St1} \quad (1)$$

where $M_{ges}$: $(=M_{Zug}+M_A)$ total mass of the trailer train calculated from mass $M_{zug}$ of the towing vehicle and the mass $M_A$ of the trailer/semitrailer, $a_1$: acceleration of the trailer train at instant $t_1$, which is before the braking operation is introduced at instant $T_4$, $F_{antr1}$: motive force/braking force of the vehicle engine at instant $t_1$, $F_{Reib1}$: rolling friction force at instant $t_1$, $F_{L1}$: aerodynamic drag at instant $t_1$, and $F_{St1}$: downgrade force at instant $t_1$.

At instant $t_2$, which follows instant $T_4$ when one or more of the vehicle braking systems are applied (during time span $\Delta T_2$), it is necessary for braking force $F_{Br}$ to be additionally considered in the balance of momentum:

$$M_{ges}*a_2 = F_{antr2} + F_{Reib2} + F_{L2} + F_{L2} + F_{St2} + F_{Br} \quad (2)$$

where:

$a_2$: is the acceleration of the trailer train at instant $t_2$, which follows the start of the braking operation at instant $T_4$, $F_{antr2}$: motive force/braking force of the vehicle engine at instant $t_2$, $F_{Reib2}$: rolling friction force at instant $t_2$, $F_{L2}$: aerodynamic drag at instant $t_2$, and $F_{St2}$: downgrade force at instant $t_2$.

It can be assumed that the two instants $t_1$ and $t_2$, when the vehicle acceleration values $a_1$ and $a_2$ are detected, follow one another in relatively close time succession, then the assumption can be made that rolling friction force $F_{Reib}$, aerodynamic drag $F_L$, and downgrade force $F_{St}$ are the same at both instants. If, at this point, the two acquisition instants $t_1$ and $t_2$ are selected to be such that instant $t_1$ immediately precedes the start of the braking operation, and instant $t_2$ immediately follows the start of the braking operation, then the assumption can also be made that the motive or braking force $F_{antr}$ of the vehicle engine is approximately the same at both instants. Further explanations will be given with regard to the precise selection of the two instants $t_1$ and $t_2$ on the basis of the description of the two exemplary embodiments.

With these conditions (e.g., assumptions), by substituting equation (1) in equation (2), it follows for total mass $M_{ges}$ of the trailer train that:

$$M_{ges} = \frac{F_{Br}}{a_2 - a_1} \quad (3)$$

However, if the influences of the aerodynamic drag, of the rolling friction force, of the downgrade force and/or of the engine are known, then these can, of course, be used for the determination of mass. Given a known engine motive force or engine braking force, it follows then that:

$$M_{ges} = \frac{F_{antr2} - F_{antr1} + F_{Br}}{a_2 - a_1} \quad (4)$$

Since, in particular in the case of a towing vehicle having a semitrailer, the mass of the towing vehicle that does not change considerably, is generally known, it results for the unknown semitrailer mass that:

$$M_A = M_{ges} - M_{Zug} \quad (5)$$

First Exemplary Embodiment

For instants t1 and t2 selected in accordance with the first specific embodiment (determining vehicle acceleration values $a_1$ and $a_2$), the following conditions are utilized:

1. The braking pressure to be fed into the wheel brakes of the towing vehicle and the application pressure required for the wheel brake linings to engage are known.

2. The chronological sequence should be such that the wheel brakes of the towing vehicle act before the wheel brakes of the trailer/semitrailer.

3. The (functional) relation between wheel brake pressure $P_{Br}$ and resultant braking force $F_{Br}$ should be known when working with the wheel brakes of the towing vehicle:

$$F_{Br}=f(P_{Br}).$$

4. The acceleration of the trailer train should be known, for example from the wheel speeds of the non-driven wheels.

5. Total mass $M_{ges}$ acting in the moving direction of the trailer train is constant. This means that there should be no change in the bearing configuration (impact) at the coupling point between the towing vehicle and the trailer/semitrailer.

6. The motive or braking force $F_{antr}$ of the vehicle engine should be known or be constant for the two instants t1 and t2. When working with present-day engine control units, the motive or braking force $F_{antr}$ is generally known, i.e., it can be calculated using the data, such as the (indexed) engine output torque, available in the engine control unit.

7. The disturbing influences on the motion of the trailer train, such as rolling friction, aerodynamic drag, and downgrade force are known, or are to be assumed as constant for the two instants t1 and t2.

Figure 4:
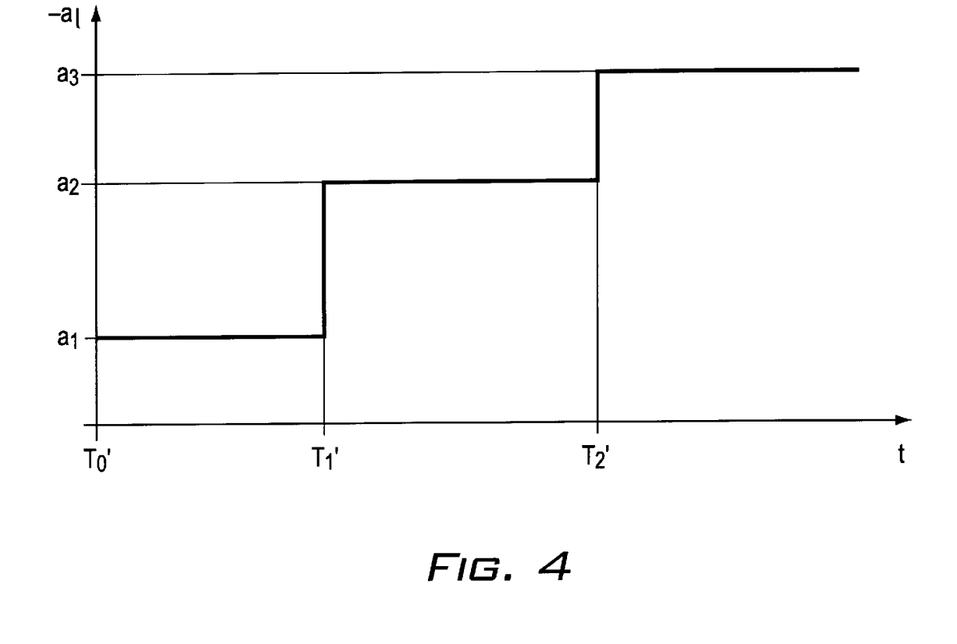
FIG. 4 shows a second variation in the braking operation over time.

In the first exemplary embodiment of the present invention to be described on the basis of FIG. 4, first acceleration value $a_1$ is measured at instant t1 (in the time interval between $T_0'$ and $T_1'$ shown in FIG. 4) when, for example, the driver of the vehicle has actuated brake pedal 13 at instant $T_0'$, however, the vehicle brakes have not yet engaged at instant $T_1'$. This means that an immediate deceleration of the vehicle by the wheel brakes is imminent, but these wheel brakes are not yet causing a deceleration. This instant can be ascertained, for example, by analyzing the brake light signal.

Starting with instant $T_1'$, the wheel brake linings are applied, and the resultant vehicle deceleration begins. Second acceleration value a2 should be detected by instant T2' when the wheel brakes of the trailer/semitrailer are applied. Between $T_1'$ and $T_2'$, the entire trailer train is decelerated only by the wheel brakes of the towing vehicle. Braking force $F_{Br}$ effected by the wheel brakes in the time interval between $T_1'$ and $T_2'$ is known in accordance with the third condition mentioned above.

Thus, according to equation (3) or (5), total mass $M_{ges}$ or the mass of the trailer/semitrailer can be determined. If the motive force is known, then equation (5) applies.

If the instant along with the corresponding application pressure is known for the trailer/semitrailer, then a third momentum equation can be formulated:

$$m_{ges}*a_3=F_{antr3}+F_{Reib3}+F_{L3}+F_{St3}+F_{Br,Z}+F_{Br,A} \quad (6)$$

In this relation, the two braking forces are to be considered—that of towing vehicle $F_{Br,Z}$ and that of trailer/semitrailer $F_{Br,A}$. Other variables correspond to those already described, however at instant t3, when the wheel brakes of the trailer/semitrailer are engaged. Here as well, analogously to the third condition, braking pressure $P_{Br,A}$ of the trailer/semitrailer must be measured, and a relation between trailer/semitrailer braking pressure $P_{Br,A}$ and trailer/semitrailer braking force $P_{Br,A}$ must be known:

$$F_{Br,A}=f(P_{Br,A}).$$

The mass value ascertained on the basis of acceleration value $a_3$ leads to a redundancy in the mass determination, making it possible to diminish measuring uncertainties.

Superimposed on the measured quantities is interference, such as noise. Such interference is able to be minimized by properly averaging over a plurality of measurements in the time periods between $T_1'$ and $T_2'$ (measuring $a_1$) or $T_2'$ and $T_3'$ (measuring $a_2$), or after $T_3'$ (measuring $a_3$).

Second Exemplary Embodiment

In the first specific embodiment, on one hand, the application pressure of the wheel brakes at the towing vehicle is known, and, on the other hand, the relation between wheel brake pressure $P_{Br}$ and resultant braking force $F_{Br}$.

In a second exemplary embodiment, only those braking operations are retrieved (e.g., considered) during which the supplementary retarding braking device (retarder and/or engine braking device) provided on the towing vehicle is used for the deceleration. This automatically ensures that only the towing vehicle is braking.

In present-day supplementary retarding braking devices, particularly in retarders, information is available in the corresponding retarder control unit, from which the braking force effected by the retarder can be inferred. In addition, supplementary retarding braking systems of this kind are generally not subject to the influence of possibly unknown brake-lining properties.

Figure 3A:
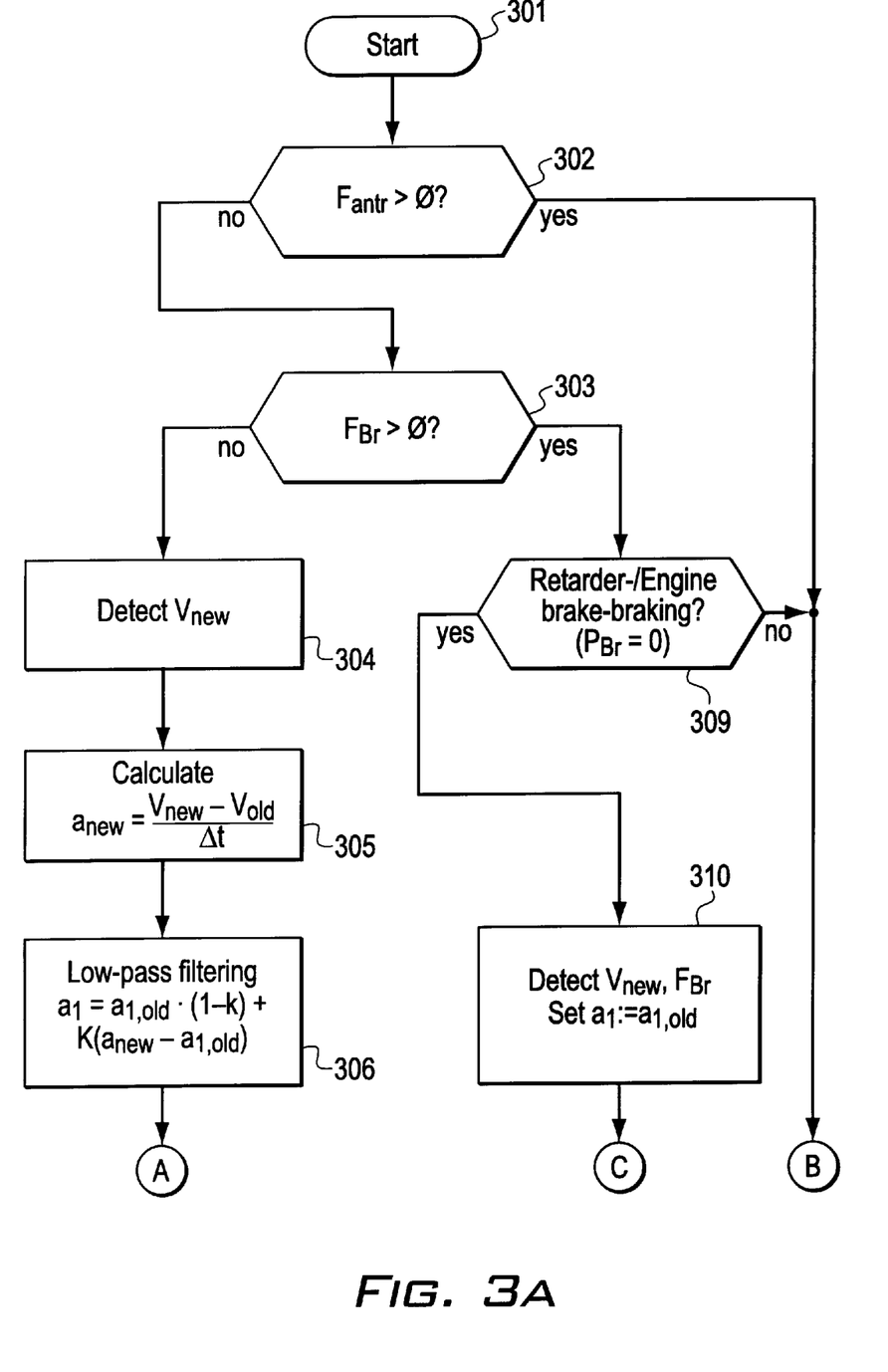
FIG. 3a shows a first part of a functional sequence of an exemplary embodiment according to the present invention.
Figure 3B:
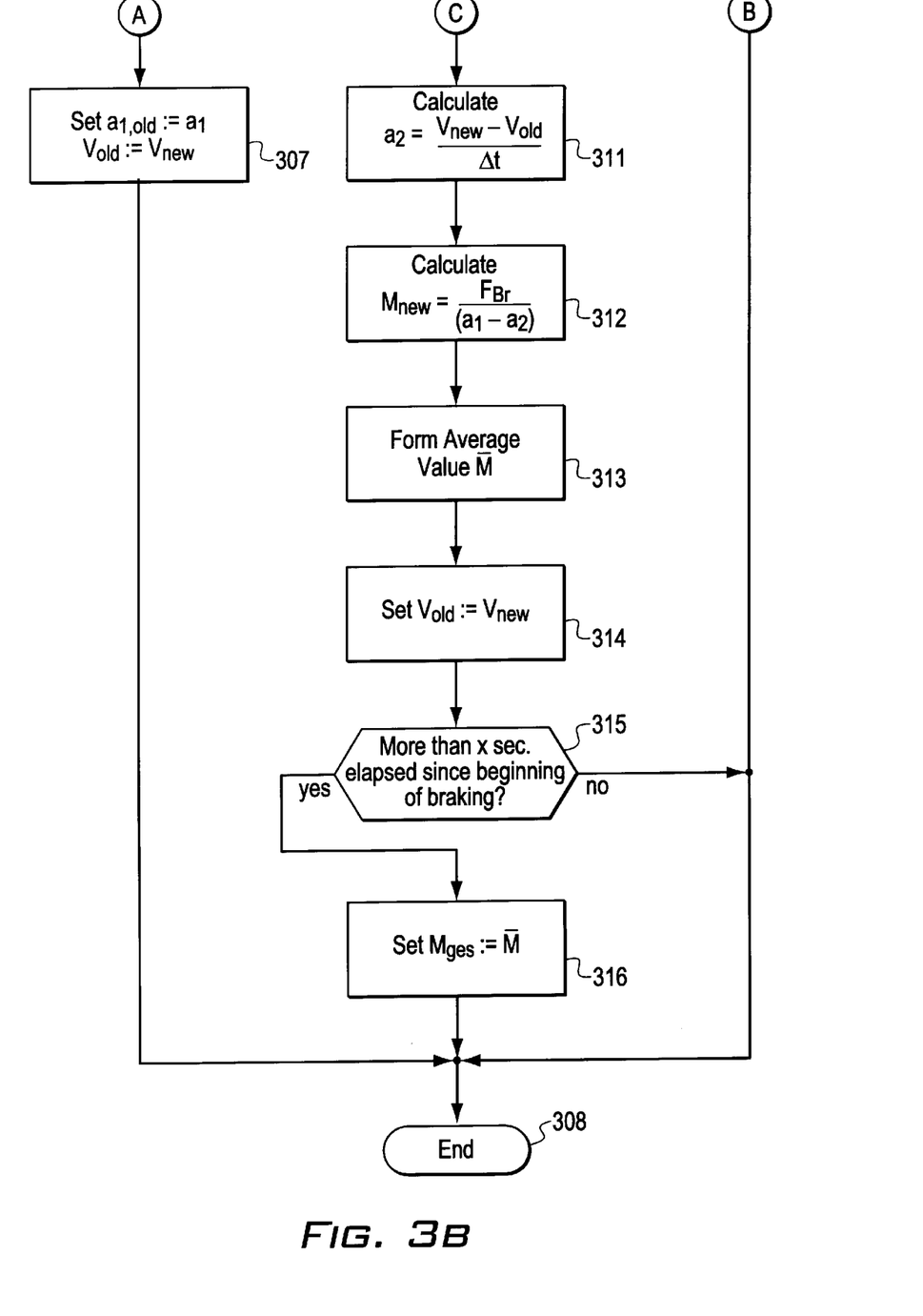
FIG. 3b shows a second part of the functional sequence shown in FIG. 3a of the exemplary embodiment according to the present invention.

The second exemplary embodiment is described below with reference to FIGS. 2, 3a and 3b. In this context, FIG. 2, which has already been described in part, shows a typical braking operation; and FIG. 3 shows a program executed which is run through, for example, every $\Delta t=10$ ms.

Following initial step 301, the query is made in step 302 whether the motive force is greater than zero. If this is the case, then the vehicle is before instant $T_2$ shown in FIG. 2, which means that a deceleration operation is not immediately intended. In this case, the program immediately jumps to final step 308.

If it is determined, however, for the first time in step 302 that no motive force is at hand (instant $T_2$), then this is a first indication that a deceleration maneuver is immediately imminent. In this case, for example, the driver of the vehicle will place gas pedal 12 in the neutral position. Step 303 queries whether a braking force greater than zero. If this is not the case, then one is within interval $\Delta T_1$ shown in FIG. 2. In step 304, the instantaneous (e.g., active) vehicle velocity $V_{new}$ is then measured, for example, from the wheel speeds of the non-driven wheels, whereupon in step 305, instantaneous acceleration anew is calculated from active vehicle velocity $V_{new}$, from the previously measured value $V_{old}$, and from program processing time $\Delta T$. This, of course, is not possible during the first run-through of the program loop starting with step 304.

$$a_{new} = \frac{V_{new} - V_{old}}{\Delta t} \quad (7)$$

In step 306, thus calculated value $a_1$, low-pass filtered is determined in a generally known manner, to yield:

$$a_1=_{1,old}*(1-k)+k*(a_{new}-a_{1,old}) \quad (b\ 8)$$

wherein k is a constant empirically determined or otherwise selected in accordance with the desired response or characteristics of the system.

In step 307, thus determined value a, and $V_{new}$ are set to equal values $a_{1,old}$ and $V_{old}$.

After the final step, the program run is started anew with a predefined cycle timing.

Shortly after instant $T_4$, it is ascertained for the first time in step 303 that braking force $F_{Br}$ is greater than zero. Step 309 then queries whether a braking by supplementary retarding braking device (retarder/engine brake) or a braking by the wheel brake is at hand. In response to an operated wheel brake, the process immediately jumps to final step 308 and the procedure determining mass is stopped.

At this point, when a deceleration effected exclusively by the retarder and/or by the engine brake is ascertained as of instant $T_4$, the active values for vehicle's longitudinal velocity $V_{new}$ and for braking force $F_{Br}$ are detected in step 310. At the same time, longitudinal acceleration value $a_{1,old}$ calculated prior to instant T4 is set to equal $a_1$.

In step 311, as in step 306, active vehicle longitudinal acceleration a2

$$a_2 = \frac{V_{new} - V_{old}}{\Delta t} \tag{9}$$

is calculated.

In subsequent step 312, a value $M_{new}$ is calculated (according to equation 3)

$$M_{new} = \frac{F_{Br}}{(a_1 - a_2)} \tag{10}$$

whereupon in step 313, average value $\overline{M}$ is generated on the basis of all mass values $M_{new}$ since beginning of braking at $T_4$. In step 314, value $V_{old}$ is up-dated, in that it is set to equal $V_{new}$.

The query is made in step 315 whether more than one predefinable time period (for example 1 sec.) has elapsed since the beginning of braking at $T_4$. If this is not the case, the process skips to final step 308, otherwise the total mass is output in step 316 as average value $\overline{M}$.

What is claimed is:

1. A method for determining a mass of a vehicle having at least one actuatable braking device, comprising the steps of:
    a first step of determining at least one first acceleration value indicative of an acceleration of the vehicle before the at least one braking device is actuated;
    a second step of determining at least one second acceleration value indicative of the vehicle after the at least one braking device is actuated and after the first determining step; and
    determining the vehicular mass as a function of the first and second acceleration values determined in the first and second determining steps.

2. The method according to claim 1, wherein the vehicular mass is a mass of a commercial vehicle having a towing vehicle and a trailer/semitrailer.

3. The method according to claim 2, wherein the at least one actuatable braking device acts on wheels of at least one of the towing vehicle and the trailer/semitrailer.

4. The method according to claim 3, wherein the second acceleration value is determined when the at least one braking device is not acting on the wheels of the trailer/semitrailer.

5. The method according to claim 1, further comprising the step of:
    measuring a braking value representing a braking action, the braking action resulting from an actuation of the at least one braking device.

6. The method according to claim 5, wherein the braking value is measured when the second acceleration value is measured, and wherein the vehicular mass is determined as a function of the measured braking value.

7. The method according to claim 5, further comprising the step of:
    determining a third acceleration value when the at least one braking device acts on wheels of a trailer/semitrailer, wherein the vehicular mass is determined as a function of the determined third acceleration value.

8. The method according to claim 1, further comprising the step of:
    measuring a motive value representing one of a drive and a propulsion of the vehicle, wherein the first acceleration value is determined when the measured motive value falls below a predefined threshold value.

9. The method according to claim 8, wherein the motive value includes at least one of a propelling value and a tractive value.

10. The method according to claim 1, further comprising the step of:
    determining a deceleration value representing an input command of a driver for decelerating the vehicle, wherein the first acceleration value is determined when the determined deceleration value is equal to a predefined value.

11. The method according to claim 1, wherein at least one of the first acceleration value and the second acceleration value is a low-pass-filtered value.

12. A method for determining a mass of a vehicle having at least one actuatable braking device, comprising the steps of;
    determining at least one first acceleration value indicative of an acceleration of the vehicle before the at least one braking device is actuated;
    determining at least one second acceleration value indicative of the acceleration of the vehicle after the at least one braking device is actuated;
    determining the vehicular mass as a function of the determined first and second acceleration values; and
    measuring a braking value representing a braking action, the braking action resulting from an actuation of the at least one braking device;
    wherein the at least one actuatable braking device includes at least one of a wheel brake device of the towing vehicle and a supplementary retarding braking system, the supplementary retarding braking system including at least one of a retarder and an engine braking system,
    wherein:
        if the wheel brake device is actuated by pressurized hydraulic brakes, the braking value is determined as a function of wheel brake pressures of the pressurized hydraulic brakes,
        if the wheel brake device is electromotively actuated, the braking value is determined as a function of a variable representing the actuation, and
        if at least one of the retarder and the engine braking system is utilized, the braking value is determined as a function of at least one of the retarder and an engine braking torque,
    wherein, if the supplementary retarding braking system includes a hydrodynamic retarder, the braking value is determined as a function of a variable representing a hydraulic pressure, and wherein if the supplementary retarding braking system includes the engine braking system, the braking value is determined as a function of a position of a switch activating the engine braking system.

13. A device for providing a signal indicative of a mass of a vehicle, the vehicle having at least one actuatable braking device to act on wheels of the vehicle, the device comprising:

an arrangement:
measuring at least one first acceleration value representing an acceleration of the vehicle before the at least one braking device is actuated,
measuring at least one second acceleration value representing the acceleration of the vehicle after the at least one braking device is actuated and after measuring the at least one first acceleration value, and
determining the signal indicative of the vehicular mass as a function of the measured first and second acceleration values.

14. The device according to claim 13, wherein the vehicle is a commercial vehicle having a towing vehicle and a trailer/semitrailer.

15. The device according to claim 14,
wherein the arrangement at least one of measures the second acceleration value when the at least one braking device is not acting on the wheels of the trailer/semitrailer and detects a braking value representing a braking action produced by an actuation of the at least one braking device, and
wherein the vehicular mass is determined as a function of the detected braking value.

16. The device according to claim 15, wherein the braking value is detected when the second acceleration value is measured.

* * * * *

UNITED STATES PATENT AND TRADEMARK OFFICE
CERTIFICATE OF CORRECTION

PATENT NO. : 6,144,928
DATED : November 7, 2000
INVENTOR(S) : Leimbach et al.

Page 1 of 1

It is certified that error appears in the above-identified patent and that said Letters Patent is hereby corrected as shown below:

<u>Column 6,</u>
Line 48, change "...anew ..." to -- a new --.
Line 60, change "$a_1=_{1,old}$" to -- $a_1=a_{1,old}$ --.
Line 60, change "(b8)" to -- (8) --.
Line 64, change "... a, ..." to -- $a_1$ --.

Signed and Sealed this

Sixth Day of November, 2001

Attest:

NICHOLAS P. GODICI
Attesting Officer
Acting Director of the United States Patent and Trademark Office